United States Patent [19]

Caple et al.

[11] Patent Number: 4,601,842
[45] Date of Patent: Jul. 22, 1986

[54] PREVENTION OF FREEZING AT MODERATE SUPERCOOLING USING BIOGENIC ICE NUCLEATION INHIBITORS

[75] Inventors: Gerald Caple; Richard G. Layton, both of Flagstaff, Ariz.

[73] Assignee: University Patents, Inc., Westport, Conn.

[21] Appl. No.: 603,540

[22] Filed: Apr. 25, 1984

Related U.S. Application Data

[63] Continuation of Ser. No. 517,938, Aug. 1, 1983, abandoned, which is a continuation of Ser. No. 282,996, Jul. 14, 1981, abandoned.

[51] Int. Cl.$^4$ ............................................. A01G 1/00
[52] U.S. Cl. ........................................ 252/70; 47/2; 47/58; 106/13; 106/124; 106/154.1; 260/705; 424/93; 435/2; 530/370
[58] Field of Search ................... 252/70; 106/13, 124, 106/154.1; 47/2, 58; 424/93; 260/112 R, 123.5, 236.5, 705

[56] References Cited

U.S. PATENT DOCUMENTS

| | | | |
|---|---|---|---|
| 3,555,727 | 1/1971 | Jaquith | 47/2 |
| 3,669,898 | 6/1972 | Butler | 47/2 |
| 3,712,803 | 1/1973 | Grybek et al. | 47/2 |
| 4,045,910 | 9/1977 | Arny et al. | 47/58 |
| 4,161,084 | 7/1979 | Arny et al. | 47/58 |
| 4,169,090 | 9/1979 | Murray et al. | 260/112 R |
| 4,366,097 | 12/1982 | Cameron et al. | 260/123.5 |

FOREIGN PATENT DOCUMENTS 869990 2/1979 Belgium.
58174329 10/1983 Japan.

Primary Examiner—Paul Lieberman
Assistant Examiner—Robert A. Wax
Attorney, Agent, or Firm—Barbara A. Shimei

[57] ABSTRACT

A biogenic ice nucleation inhibitor, derivable from a source plant which is normally subjected to freezing stress in its natural habitat, is employed for protecting light frost-sensitive plants against frost injury by inhibiting the ice-nucleating activity of the ice-nucleating bacteria normally present on the plants, and thereby reducing the temperature at which frost injury occurs. The inhibitor is applied to the plants in the form of a solution of a water-soluble denaturable proteinaceous material derivable as a water extract of a source plant component which survives the freezing stress to which the source plant is normally subjected in its natural habitat, such as the seed. The inhibitor is also applicable for reducing the temperature at which ice formation occurs in any other medium containing active ice nucleation initiators, such as, for example, the atmosphere and concrete.

4 Claims, No Drawings

PREVENTION OF FREEZING AT MODERATE SUPERCOOLING USING BIOGENIC ICE NUCLEATION INHIBITORS

This is a continuation, of application Ser. No. 517,938 filed Aug. 1, 1983 which in turn is a continuation of application Ser. No. 282,996, filed on July 14, 1981, both now abandoned.

BACKGROUND OF THE INVENTION

This invention relates to the inhibition of ice formation at moderate supercooling temperatures and, more particularly, to the protection of light frost-sensitive plants against frost injury.

Damage to crops by frost is one of the leading causes of loss in agricultural output due to natural phenomenon variability in the world, to be exceeded only by drought and flooding, pests and disease. It is estimated that from 5-15% of the gross world agricultural product may be so lost to frost damage in one year. In some regional areas (i.e. counties, valleys) the loss may approach 100%.

The greatest amount of frost damage to sensitive crops does not occur in northern or cold climates. Instead, it occurs at mid- and low-latitudes and at high altitude equatorial locations where high value food crops such as soybean, corn, orchard fruits, and vegetables are grown. For instance, the orchards of California, vineyards of Italy, the corn and soybeans of Iowa, and potatoes of Ecuador all suffer damage each year from the same phenomenon—light night frost at temperatures from $-1°$ C. to $-4°$ C.

It has been estimated by the United States Department of Agriculture that about 1.5 billion dollars of agricultural products is lost to frost damage in the United States each year. The worldwide total is probably in excess of 10 billion dollars.

For the most part, present frost protection methods are centered around the principle of maintaining heat in a crop to keep it from cooling below the freezing point where frost is imminent. This is done by a variety of methods such as burning oil or natural gas, stirring the air over crops, sprinkling the crops with water, and covering them. With the cost of petroleum becoming more expensive and pressures against polluting the air with anthropogenic fires, heating large areas of agricultural land to prevent frost damage may become increasingly unpopular in the future. Also, these measures all require a considerable amount of equipment, trained and available manpower, and are capital intensive.

In addition to these physical methods, chemical methods of frost protection for growing plants have been attempted by application of various chemical compounds onto the plants with the view of lowering the temperature at which the plant tissues would freeze. These previously proposed chemical methods have tended to be unreliable, expensive, and ecologically unsound.

Frost damage to plants occurs when intracellular liquid in the plant tissues freezes with resulting rupture of adjacent cell walls and cell membranes. It is known that plant tissues may supercool to temperatures of around $-6°$ C. in the absence of external ice nuclei. The internal plant tissues do not generally initiate ice at temperatures warmer than this $-6°$ C. threshold.

It has recently been established that there are a very few bacteria species which can act as ice-forming nuclei at relatively warm temperatures, i.e., $-1°$ C. to $-3°$ C. The bacteria *Erwinia herbicola* and *Pseudomonus syringae* have been identified as being representative, if not the sole species, of these bacteria acting as ice nucleants on plant tissues.

To protect plants from frost damage, it is therefore desirable to have available means for reducing the populations or otherwise inhibiting the ice-nucleating activity of the ice-nucleating bacteria on plant leaves, so as to thereby reduce the temperature at which frost injury occurs to temperatures approaching $-6°$ C. The use of various chemical bactericides for this purpose has not thus far proven to be a satisfactory approach, since besides being expensive and ecologically unsound, such bactericides have not been species specific to the ice-nucleating bacteria, but instead have been deleterious to the plants by also killing the beneficial bacteria.

Another recently proposed approach to this problem, as described in the Arny et al U.S. Pat. Nos. 4,045,910 and 4,161,084, incorporated herein by reference, is to apply to the plants competitive non-ice-nucleating bacteria in an amount sufficient to increase the proportion of non-ice-nucleating bacteria to ice-nucleating bacteria from that normally present on the plants, thereby reducing the probability that sufficient numbers of ice-nucleating bacteria will be able to grow on the plant leaves. This approach requires application of the competitive bacteria at a rather substantial time prior to the onset of freezing temperature and/or at a rather early stage of plant growth so as to enable the competitive bacteria to adequately establish themselves on the plant leaves in order to be effective, and has not been found to be fully reliable or confidently repeatable in field trials.

SUMMARY OF THE INVENTION

It is, accordingly, a primary object of the present invention to provide an improved method for preventing ice formation at moderate supercooling temperatures in various media containing active ice nucleation initiators.

Another object of the invention is to provide an improved method for protecting plants against frost injury, which is more reliable, convenient and economical than the prior art frost protection procedures.

A further object of the invention is to provide an improved method for protecting plants against frost injury in accordance with the preceding object, which is ecologically sound and leaves no harmful residue which collects in the environment, and which is harmless to plants and animals.

Still another object of the invention is to provide an improved method for protecting plants against frost injury in accordance with the preceding objects, which can suitably be employed at any stage of plant growth and as late as immediately prior to the onset of freezing temperature.

A still further object of the invention is to provide an ice nucleation-inhibiting composition which specifically inhibits the ice-nucleating activity of ice nucleation initiators, including ice-nucleating bacteria normally present on plants, without harming any other living organism.

Yet another object of the invention is to provide an ice nucleation-inhibiting composition in accordance with the preceding object, which is suitable for being conveniently and economically sprayed onto plants by means of conventional irrigation sprinklers or insecticide foggers.

The above and other objects are achieved in accordance with the present invention by means of biogenic ice nucleation inhibitors which are effective for inhibiting the ice-nucleating activity of a broad spectrum of ice nucleation initiators, including all of the various ice-nucleating bacteria normally present on plants, without in any way harming any other living organism. The biogenic ice nucleation inhibitors of the present invention are derivable from a large variety of source plants which are normally subjected to freezing stress in their natural habitat, and are employed in the form of a solution of a water-soluble denaturable proteinaceous material derivable as a water extract of a source plant component which survives the freezing stress to which the source plant is normally subjected in its natural habitat, such as the seed of the source plant. When topically applied to light frost-sensitive plants at a time sufficiently prior to the on-set of freezing temperature and in a sufficient concentration of the proteinaceous material, such solutions protect the plants against frost injury by inhibiting the ice-nucleating activity of the ice-nucleating bacteria normally present on the plants, thereby reducing the temperature at which frost injury occurs to temperatures approaching $-6°$ C.

Since the ice nucleation inhibitors of the present invention are derived from plant material, their application to plants is ecologically sound and leaves no harmful residue which collects in the environment. They may conveniently and economically be sprayed onto the plants by means of conventional irrigation sprinklers or insecticide foggers. Application may suitably be carried out at any stage of plant growth, and at a time ranging from immediately prior to the on-set of freezing temperature up to about forty-eight hours prior to the on-set of freezing temperature.

DESCRIPTION OF PREFERRED EMBODIMENTS

The biogenic ice nucleation inhibitors in accordance with the present invention are derivable from a wide variety of source plants which are normally subjected to freezing stress in their natural habitats. Such source plant will generally be a species belonging to the angiosperm class of plants. Suitable species of source plants from which the inhibitors of the present invention may be derived include, for example, those belonging to the Rosaceae family (e.g., peach, plum, apricot, cherry, apple, and rose); the Buxaceae family (e.g., jojoba); the Linaceae family (e.g., flax); the Leguminosae family (e.g., pea, bean, clover, lupine, lentil, black locust and alfalfa); the Labiatae family (e.g , peppermint, spearmint, thyme, sage, and lavender); the Umbelliferae family (e.g., parsley); the Compositae family (e.g., lettuce and sunflower); the Gramineae family (e.g., wheat, rye, barley, oats, rice and millet); and the Iridaceae family (e.g., iris and crocus).

Particularly suitable source plants for the biogenic ice nucleation inhibitors of the present invention, have been found to be peach, plum, apricot, cherry, jojoba and flax.

The component of the source plant from which the biogenic ice nucleation inhibitors of the present invention are derived, is a component of the plant which survives the freezing stress to which the source plant is normally subjected in its natural habitat, such as the seed, the bud, or the young shoot. The active inhibiting material is typically most highly concentrated in the seed of the source plant, and is thus most conveniently obtained from the seed.

The biogenic ice nucleation inhibitors of the present invention can be readily extracted from the source plant component with water by crushing the component material and stirring the crushed material with distilled water for periods of time ranging from about three to about fifty-five hours. The residual solid material may then be removed, for example, by vacuum filtration. The aqueous filtrate contains dissolved therein a water-soluble denaturable proteinaceous material, which constitutes the active ice nucleation inhibitor. The aqueous solution of the inhibitor thus obtained may be used directly as the ice nucleation-inhibiting composition in accordance with the present invention, or it may be diluted or concentrated, as desired, prior to use.

For use as an ice nucleation-inhibiting composition in accordance with the present invention, the proteinaceous active inhibitor should be in the form of a solution, preferably an aqueous solution, suitably having a concentration of the proteinaceous material ranging from about $10^{-7}$ molar up to a saturated solution. Preferably, the concentration of the proteinaceous material in the solution is at least about 30 mg/ml. The optimal concentration of the proteinaceous material in the solution is not based upon the colligative properties of the proteinceous material, but rather on the active ice nucleation initiator content of the medium to which the inhibitor solution is to be applied. For example, when being applied to plants to inhibit the ice-nucleating activity of the ice-nucleating bacteria present on the plants, optimal concentrations could be determined by bacterial count tests.

The ice nucleation-inhibiting compositions of the present invention may suitably be topically applied to the plants by spraying, for example, by means of conventional irrigation sprinklers, insecticide foggers, or small hand sprayers. The composition should be sprayed on the plants in an amount sufficient to wet the plant leaves. For a typical leaf, assuming good wetting, and a concentration of ice-nucleating bacteria of $10^6$ cells per $cm^2$ of leaf surface, for optimum frost protection, the application should not fall below about 0.3 mg/$cm^2$ of leaf surface. This figure would have to be increased for higher bacterial counts. Under proper conditions, significant frost protection can be obtained with concentrations of as low as about 3 $\mu$g/$cm^2$ of leaf surface. Concentrations greater than 0.3 mg/$cm^2$ of leaf surface can be used, but other than providing a safety factor, will generally offer no significant gains in protection.

In order to obtain satisfactory frost protection with the ice nucleation-inhibiting compositions of the present invention, the inhibitor solution should be applied to the plants at a time ranging from immediately prior to the on-set of freezing temperature up to about forty-eight hours prior to the on-set of freezing temperature. Optimum results are obtained when the application takes place as close as possible to the on-set of freezing temperature.

The ice nucleation-inhibiting compositions of the present invention may suitably be applied to plants in conjunction with other known frost prevention compositions to obtain the maximum advantage of each technique. For example, the competitive non-ice-nucleating bacteria technique described in the Arny et al U.S. Pat. Nos. 4,045,910 and 4,161,084, incorporated herein by reference, is generally ineffective for providing frost protection until a rather substantial time, e.g., approximately forty-eight hours, following application. By using the ice nucleation-inhibitors of the present invention in conjunction with the Arny et al technique, such as, for example, by including non-ice-nucleating bacteria suspended in the inhibitor solutions of the present invention in an amount sufficient to increase the proportion of non-ice-nucleating bacteria to ice-nucleating bacteria from that normally present on the plants, the inhibitors of the present invention could provide frost protection to the plants for the time interval necessary for the competitive bacteria to adequately establish themselves on the plant leaves in order to become effective.

While not intending to be bound by or limited to any particular theory of the mechanism of action of the ice nucleation-inhibitors of the present invention, it is believed that the proteinaceous material constituting the active inhibitor inhibits the ice-nucleating activity of the ice-nucleating bacteria by binding to the cell walls of the bacteria in a manner so as to deactivate or block the ice nucleation sites present on the cell walls.

The light frost-sensitive plants protectable against frost injury by means of the ice nucleation-inhibiting compositions of the present invention, include a wide variety of high value food crops and ornamental plants, such as, for example, beans, corn, tomatoes, pumpkins, potatoes, soybeans, a full range of citrus fruits, apples, pears, hard nuts, and a full range of cereal crops. The inhibitors of the present invention are furthermore completely biodegradable, and hence should present no environmental problems.

In addition to their use for protecting plants against frost injury, the ice nucleation-inhibiting compositions of the present invention can also be employed for reducing the temperature at which ice formation occurs in any of various other media containing active ice nucleation initiators. For example, the inhibitor compositions of the present invention, when sprayed into the atmosphere, have a potential use in weather modification. Some scientists believe that warm temperature ice nuclei are responsible for hail formation. Ice nuclei are also involved in rain, so that inhibition of their formation could possibly affect rainfall. Additionally, ice nucleation initiators present in concrete potentially could be inhibited by the ice nucleation-inhibiting compositions of the present invention in order to prevent undesired freezing of concrete prior to setting.

The invention is further illustrated by way of the following examples.

EXAMPLE I

Biogenic ice nucleation inhibitors were separately extracted from jojoba beans, peach pits, and apricot pits, by means of the following procedure.

The seed material was crushed in a mortar and pestle until no particles larger than 1.0 mm remained. The crushed seed material (2.0 grams) was added to 20 ml of distilled water, and the mixture was stirred with a magnetic stirrer for approximately 19 hours. The residual solid material was then removed by vacuum filtration Water removal from the filtrate left about 25 mg/ml of water-soluble material and about 25 mg/ml of oil (originally emulsified in the water).

EXAMPLE 2

The ice nucleation-inhibiting properties of the extracts prepared in accordance with Example I, above, were determined directly from the filtrates or diluted samples of the filtrates by means of the freezing drop method described by Vali (J. Atmos. Sci., Volume 28, Pages 402–409, 1971). This testing procedure is carried out by drawing portions of the sample for testing into a sterile plastic syringe capped with a sterile needle and using the syringe and needle combination to make equal-sized drops on a thermally controlled cold stage. The drops are positioned on a thin square of mylar or aluminum foil held on a cold surface with a light coating of mineral oil. Prior to the application of drops, the foil is coated with silicone resin using paper tissue, to assure that ice nucleation events are not influenced by extraneous nuclei on the foil surface. The silicone also causes drops to "bead up" forming hemispheres. Twenty to 100 drops of 0.01 $cm^3$ are used for each test. The temperature of the sample is then gradually supercooled, and the freezing of the drops is detected visually based on changes of the drops from clear to opaque upon freezing. From the observed freezing temperatures of the drops, ice nucleus activity spectra can be constructed.

With respect to the jojoba bean and peach pit extracts, the freezing spectra were compared with that of the original distilled water employed for the extraction. This distilled water contained many active ice nucleators and had an average freezing temperature of about −8.0° C. Water devoid of nucleators has been supercooled to about −40° C. The results of the tests indicated that each of the two extracts exhibited an average ice nucleation inhibition of approximately −3° C. to −4° C.

With respect to the apricot pit extract, the freezing spectrum was compared with that of a silver iodide suspension, silver iodide being a well-known ice nucleating agent whose nucleation properties are well known. The silver iodide suspension was prepared by adding 1.00 ml of a 0.00597 M solution of $AgNO_3$ to a 100 ml volumetric flask, diluting to about 98 ml, and then adding 1.00 ml of a 0.00606 M solution of KI. The resulting solution and silver iodide precipitate was diluted to 100.00 ml, and used in the freezing experiments. The freezing spectra were determined by adding 2 ml of the apricot pit extract to 5.0 ml of the silver iodide suspension to obtain the test samples, and adding 2 ml of distilled water to 5.0 ml of the silver iodide suspension to obtain the control blanks. The test results indicated that the apricot pit extract exhibited an average ice nucleation inhibition of about −4° C.

EXAMPLE 3

In order to determine the nature of the ice nucleation-inhibiting material present in the extracts prepared in accordance with Example 1, above, the following experiment was conducted.

The peach pit extract obtained in accordance with the procedure of Example 1, above, was filtered through a 3-micron nucleopore filter, and then diluted 2 to 1 with distilled water. Its freezing spectrum was then determined in accordance with the procedure described in Example 2, above. The filtered extract was then heated at 93° C. for 10 minutes. A white precipitate formed which was removed by refiltration, and the freezing spectrum of the resulting filtrate was then determined. The same sequence was repeated using a 0.1 micron filter. In both cases, heating denatured a protein which precipitated and was removed by filtration. In both cases, the denatured filtrate nucleated ice at a warmer temperature than the undenatured filtrate, indicating that the denaturation removed the ice nucleation-inhibiting material. The amount of protein denatured was about 30 mg/ml.

This experiment indicates that the ice nucleation-inhibiting material present in the extract is a water-soluble denaturable proteinaceous material. The ice nucleation inhibitor may possibly constitute only a part of the total denaturable protein.

EXAMPLE 4

This example illustrates the effect of the biogenic ice nucleation inhibitors of the present invention on the ice-nucleating activity of the active ice-nucleating bacteria normally present on plants.

Cultures of *pseudomonas syringiae* and *herbicola erwinia* were grown in Koser citrate media using standard microbiological techniques. Cell counts were determined to be $10^9$ cells per ml. These cultures were diluted (2,000:1 in the case of the *herbicola erwinia,* and 5:1 and 28:1 in the case of the *pseudomonas syringiae*) to obtain a workable freezing spectrum by the drop freezing method. The diluted cultures were then treated with a Koser citrate extract of peach pits (2 g/20 ml) obtained by the procedure described in Example 1, above, and the freezing spectrum determined. The ionic strengths and citrate concentrations were constant, so that the only difference between the freezing spectra obtained was caused by the addition of the peach pit extract. Comparison of the freezing spectra indicated that the peach pit extract exhibited an average ice nucleation inhibition of about $-2°$ C. to about $-3°$ C. with respect to each of the two species of ice-nucleating bacteria used.

We claim:

1. A method for inhibiting the ice-nucleating activity of ice-nucleating bacteria which comprises contacting said ice-nucleating bacteria with a biogenic ice-nucleation inhibitor comprising a solution of a water-soluble denaturable proteinaceous material derived as an aqueous extract of a source plant component which survives the freezing stress to which said source plant is normally subjected in its natural habitat, wherein said source plant is a species belonging to a family selected from the group consisting of Rosaceae, Buxaceae, Linaceae, Leguminosae, Labiatae, Umbelliferae, Compositae, Gramineae, and Iridaceae.

2. The method of claim 1 wherein said ice-nucleating bacteria are on the surface of a living plant.

3. The method of claim 1 wherein said source plant is a species selected from the group consisting of peach, plum, apricot, cherry, jojoba, and flax.

4. The method of claim 3 wherein said source plant component comprises the seeds of said source plant.

* * * * *